United States Patent
Shivalingappa et al.

(10) Patent No.: US 12,468,710 B2
(45) Date of Patent: Nov. 11, 2025

(54) APPARATUSES, COMPUTER-IMPLEMENTED METHODS, AND COMPUTER PROGRAM PRODUCTS FOR SEARCHING A GRAPH DATABASE CONFIGUREABLE VIA AN EXTENSIBLE OBJECT MODEL

(71) Applicant: Honeywell International Inc., Charlotte, NC (US)

(72) Inventors: Veeranagegowda Shivalingappa, Bangalore (IN); Siva Reddy Medapati, Bangalore (IN); Shirish Katti, Bangalore (IN); Ruchika Vikas Bhasin, Bangalore (IN); Prasad Chaudhari, Atlanta, GA (US); Mahaveer Sogani, Bangalore (IN); Harshit Tiwari, Atlanta, GA (US); Md Danish Imam, Atlanta, GA (US); Abhin Pai, Atlanta, GA (US); Aaron Dsouza, Atlanta, GA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/303,892

(22) Filed: Apr. 20, 2023

(65) Prior Publication Data

US 2024/0296161 A1    Sep. 5, 2024

(30) Foreign Application Priority Data

Mar. 2, 2023 (IN) .............................. 202311014025

(51) Int. Cl.
*G06F 16/2455* (2019.01)
*G06F 16/242* (2019.01)
(Continued)

(52) U.S. Cl.
CPC ...... *G06F 16/24568* (2019.01); *G06F 16/242* (2019.01); *G06F 16/2452* (2019.01); *G06F 16/248* (2019.01); *G06F 16/9024* (2019.01)

(58) Field of Classification Search
CPC ............. G06F 16/24568; G06F 16/242; G06F 16/2452; G06F 16/248; G06F 16/9024
(Continued)

(56) References Cited

U.S. PATENT DOCUMENTS 9,223,827 B2 * 12/2015 Hou ..................... G06F 16/2452
10,915,304 B1 * 2/2021 Agarwal ............. G06F 16/9024
(Continued)

*Primary Examiner* — Phong H Nguyen
(74) *Attorney, Agent, or Firm* — Alston & Bird LLP

(57) ABSTRACT

Embodiments of the disclosure provide for searching a graph database configurable via an extensible object model. Such embodiments enable streaming results data in response to receiving a structured search criteria data object. Some embodiments receive a request comprising a structured search criteria data object at an application programming interface (API) endpoint, wherein the structured search criteria data object is not directly consumable to query the graph database, convert the structured search criteria data object into at least one query statement, wherein the structured search criteria data object is converted using data query translation library code, and fetch a results data stream from the graph database by causing execution of the at least one query statement.

19 Claims, 12 Drawing Sheets

(51) Int. Cl.
*G06F 16/2452* (2019.01)
*G06F 16/248* (2019.01)
*G06F 16/901* (2019.01)

(58) Field of Classification Search
USPC .............................. 707/722, 760, 769, 829
See application file for complete search history.

(56) References Cited

U.S. PATENT DOCUMENTS

| | | | |
|---|---|---|---|
| 2008/0059408 A1* | 3/2008 | Barsness | G06F 16/2471 |
| | | | 707/E17.14 |
| 2008/0077642 A1* | 3/2008 | Carbone | G06F 16/29 |
| | | | 707/999.005 |
| 2013/0232138 A1* | 9/2013 | Calvert | G06F 16/134 |
| | | | 707/758 |
| 2017/0083571 A1* | 3/2017 | Shankar | G06F 16/282 |
| 2017/0161651 A1* | 6/2017 | Demarchi | G06F 16/9535 |
| 2018/0197128 A1* | 7/2018 | Carstens | G06F 16/9024 |
| 2019/0228084 A1* | 7/2019 | Ishii | G06F 16/2456 |
| 2020/0409702 A1* | 12/2020 | Coleman | G06F 16/24566 |
| 2021/0232578 A1* | 7/2021 | Cogan | G06F 16/2425 |
| 2021/0352099 A1* | 11/2021 | Rogers | H04L 63/20 |

* cited by examiner

```
{
    "inputParameters": {},
    "propertiesToInclude": null,
    "propertiesToExclude": null,
    "languageCode": "en",
    "query": {                                              ─── 610
        "matches": [{
            "type": "NodeMatch",
            "variableName": "point",                        ─── 630
            "where": [
                "type": "BinaryPredicate",
                "operand1": {
                    "type": "PropertyOperand",              ─── 640
                    "variableName": "point",
                    "propertyName": "som.guid"
                },
                "operator": "EQUALS",                       ─── 650
                "operand2": {
                    "type": "ValueOperand",                 ─── 660
                    "value": "90c3a4e9-7fb8-4855-88e1-
b971bd4dc6f4"
                }
            ],
            "classNames": [
                "iot_PhysicalPoint"                         ─── 620
            ],
            "operandByPropertyName": null,
            "optional": false
        }]
    }
}
```

```
Match(point:'iot.PhysicalPoint') where point.'som.guid' = "90c3a4e9-7fb8-
4855-88e1-b971bd4dc6f4",
```
⟵ 710

```
"iot.isActive": true,
"type": "NODE",
"parentClassNames": ["iot.PhysicalPoint"],
"iot.readWriteIdNums": "LAC03V303bmp_R4301.PV",
"som.prefix": "custom:",
"som.label": "LAC03V303bmp_R4301.PV",
"uniquid": "{iot.PhysicalPoint|iot.AttributeValue:som.guid:90c3a4e9-7fb8-4855-88e1-b971bd4dc6f4}",
"som.guid": "90c3a4e9-7fb8-4855-88e1-b971bd4dc6f4",
"iot.samplingTime": 60,
"iot.isStored": true,
"classNames": ["iot.AttributeValue", "iot.PhysicalPoint", "iot.Point"],
"unit.unitName": "unit.Percent",
"iot.timeSeriesIdNums": "LAC03V303bmp_R4301.PV",
"id": 32,
"som.unitName": "unit.Percent"
```
⟵ 720

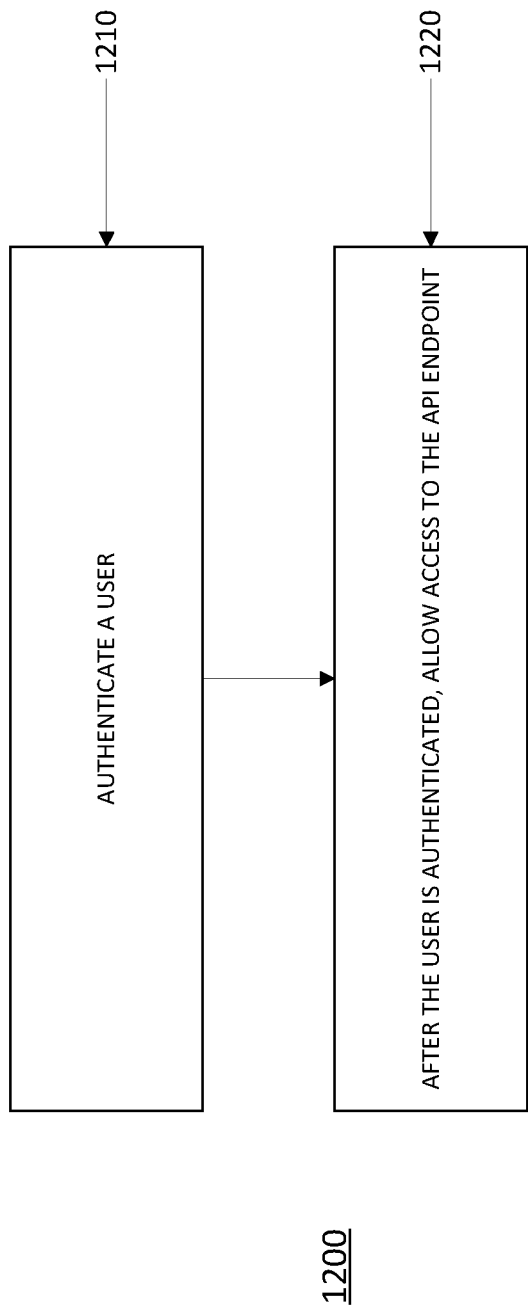

APPARATUSES, COMPUTER-IMPLEMENTED METHODS, AND COMPUTER PROGRAM PRODUCTS FOR SEARCHING A GRAPH DATABASE CONFIGUREABLE VIA AN EXTENSIBLE OBJECT MODEL

CROSS-REFERENCE TO RELATED APPLICATIONS

This application claims benefit of foreign Indian Provisional Patent Application Serial No. 202311014025, filed Mar. 2, 2023 with the Government of India Patent Office and Entitled "Apparatuses, Computer-Implemented Methods, And Computer Program Products For Searching A Graph Database Configurable Via An Extensible Object Model," which is incorporated herein by reference in its entirety.

TECHNOLOGICAL FIELD

Embodiments of the present disclosure are generally directed to searching a graph database configurable via an extensible object model, and specifically to utilizing a data object to stream results data from the graph database.

BACKGROUND

Extensible object models can include large amounts of data, including data created by an end user. Such data is often stored on a graph database. To search for particular data in such a graph database, query statements often need to be created by personnel, which can be time and resource consuming. In addition, multiple searches often need to be run using multiple API endpoints, which can be a burden on system resources.

Applicant has discovered various technical problems associated with conventional searching of graph databases. Through applied effort, ingenuity, and innovation, Applicant has solved many of these identified problems by developing the embodiments of the present disclosure, which are described in detail below.

BRIEF SUMMARY

In general, embodiments of the present disclosure herein provide for searching a graph database configurable via an extensible object model. Other implementations for searching a graph database via an extensible object model will be, or will become, apparent to one with skill in the art upon examination of the following figure and detailed description. It is intended that all such additional implementations be included within this description, be within the scope of the disclosure, and be protected by the following claims.

In accordance with an aspect of the present disclosure, a computer-implemented method for searching a graph database configurable via an extensible object model is provided. The computer-implemented method is executable utilizing any of a myriad of computing device(s) and/or combinations of hardware, software, and/or firmware. In some example embodiments, an example computer-implemented method includes receiving a request comprising a structured search criteria data object at an application programming interface (API) endpoint, where the structured search criteria data object is not directly consumable to query the graph database. The example computer-implemented method further includes converting the structured search criteria data object into at least one query statement, where the structured search criteria data object is converted using data query translation library code. The computer-implemented method further includes fetching a results data stream from the graph database by causing execution of the at least one query statement.

In some example embodiments, the computer-implemented method further includes receiving at least one name of at least one group resulting from a first sub-object of the structured search criteria data object, where the at least one name is used in a second sub-object of the structured search criteria data object.

In some example embodiments, the structured search criteria data object includes a sub-object that is converted via the data query translation code to a query statement that searches based at least in part on node matching.

In some example embodiments, the structured search criteria data object includes a sub-object that is converted via the data query translation code to a query statement that searches based at least in part on path matching.

In some example embodiments, the results data stream is returned in a nested sub-graph format.

In some example embodiments, the results data stream is returned in a flat format comprising at least one node object or relationship.

In some example embodiments, the results data stream is updated with new results data over time.

In some example embodiments, the structured search criteria data object includes a JSON data object configured to correspond to the extensible object model.

In some example embodiments, the example computer-implemented method further includes authenticating a user. The example computer-implemented method further includes, after the user is authenticated, allowing access to the API endpoint.

In some example embodiments, the results data stream is fetched based at least in part on a limit of a number of data objects indicated by a user.

In some example embodiments, the results data stream is fetched based at least in part on a limit of a number of data objects determined based at least in part on identification of a requesting application corresponding to the request.

In some example embodiments, the structured search criteria data object is converted into a plurality of query statements.

In some example embodiments, the query statement includes a cypher query statement.

In some example embodiments, the graph database includes a Neo4j instance.

In some example embodiments, the graph database includes a plurality of node objects linked by one or more relationships.

In accordance with another aspect of the present disclosure, an apparatus for searching a graph database configurable via an extensible object model is provided. The apparatus in some embodiments includes at least one processor and at least one non-transitory memory, the at least one non-transitory memory having computer-coded instructions stored thereon. The computer-coded instructions in execution with the at least one processor causes the apparatus to perform any of the example computer-implemented methods described herein. In some other embodiments, the apparatus includes means for performing each step of any of the computer-implemented methods described herein.

In accordance with another aspect of the present disclosure, a computer program product for searching a graph database configurable via an extensible object model is provided. The computer program product in some embodiments includes at least one non-transitory computer-readable storage medium having computer program code stored thereon. The computer program code in execution with at least one processor is configured for performing any one or the example computer-implemented methods described herein.

BRIEF DESCRIPTION OF THE DRAWINGS

Figure 1:
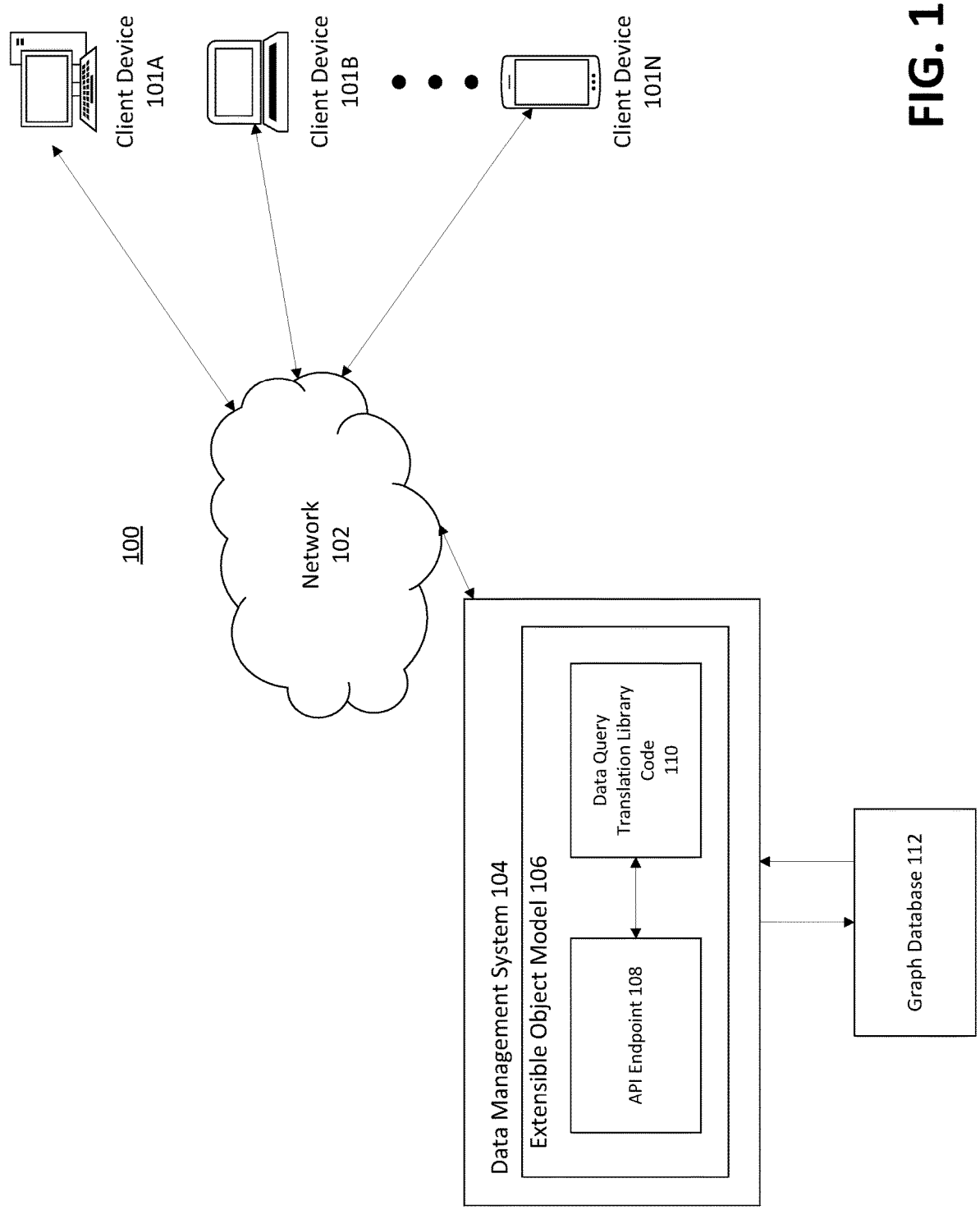
Figure 2:
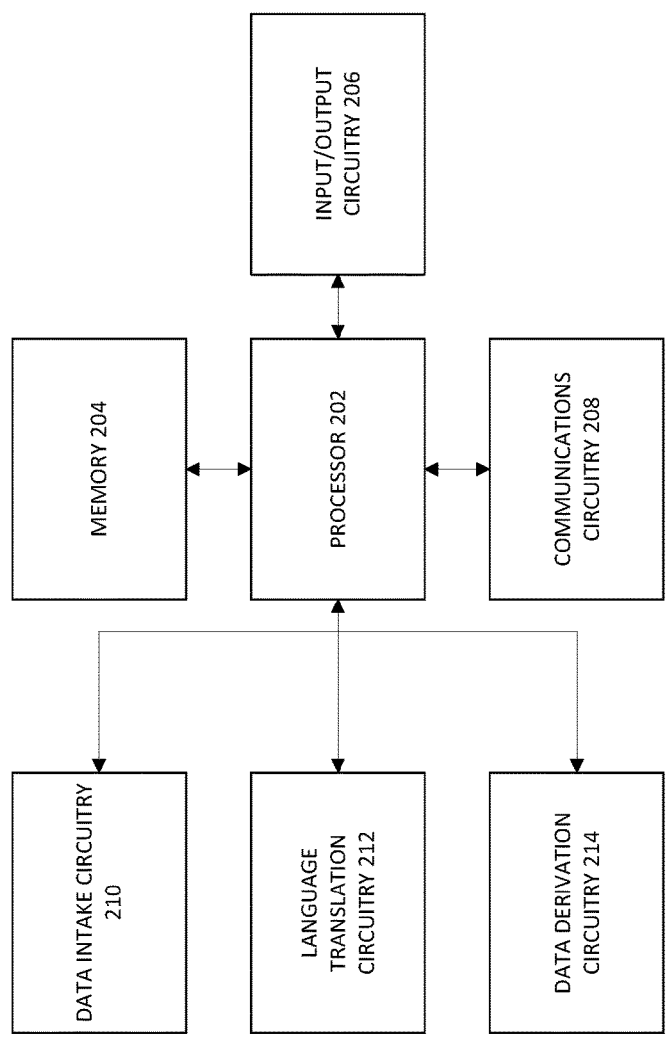
Figure 3:
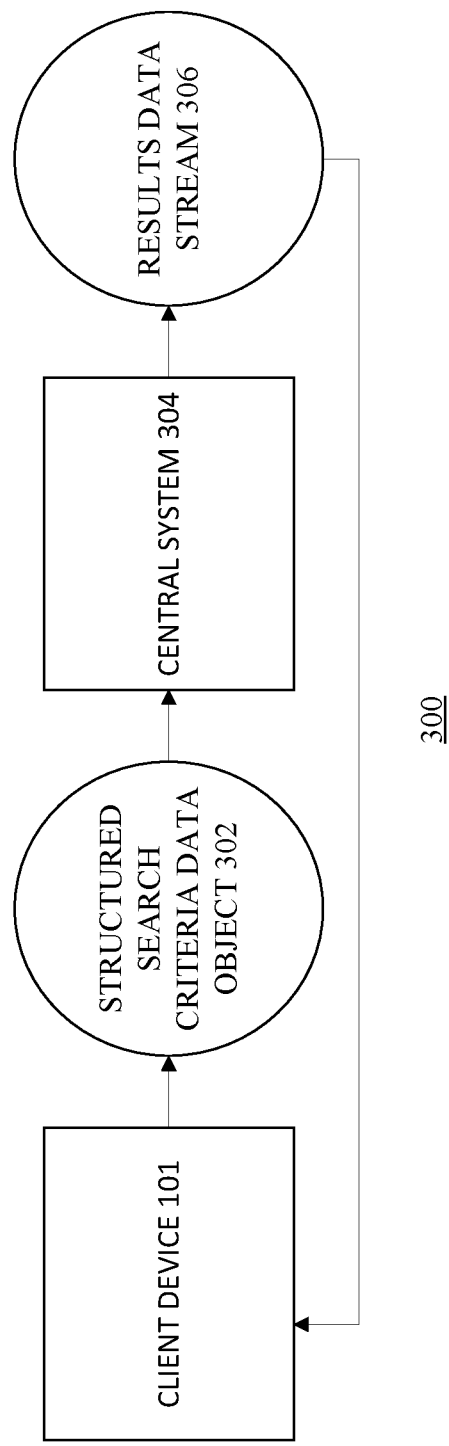
Figure 4:
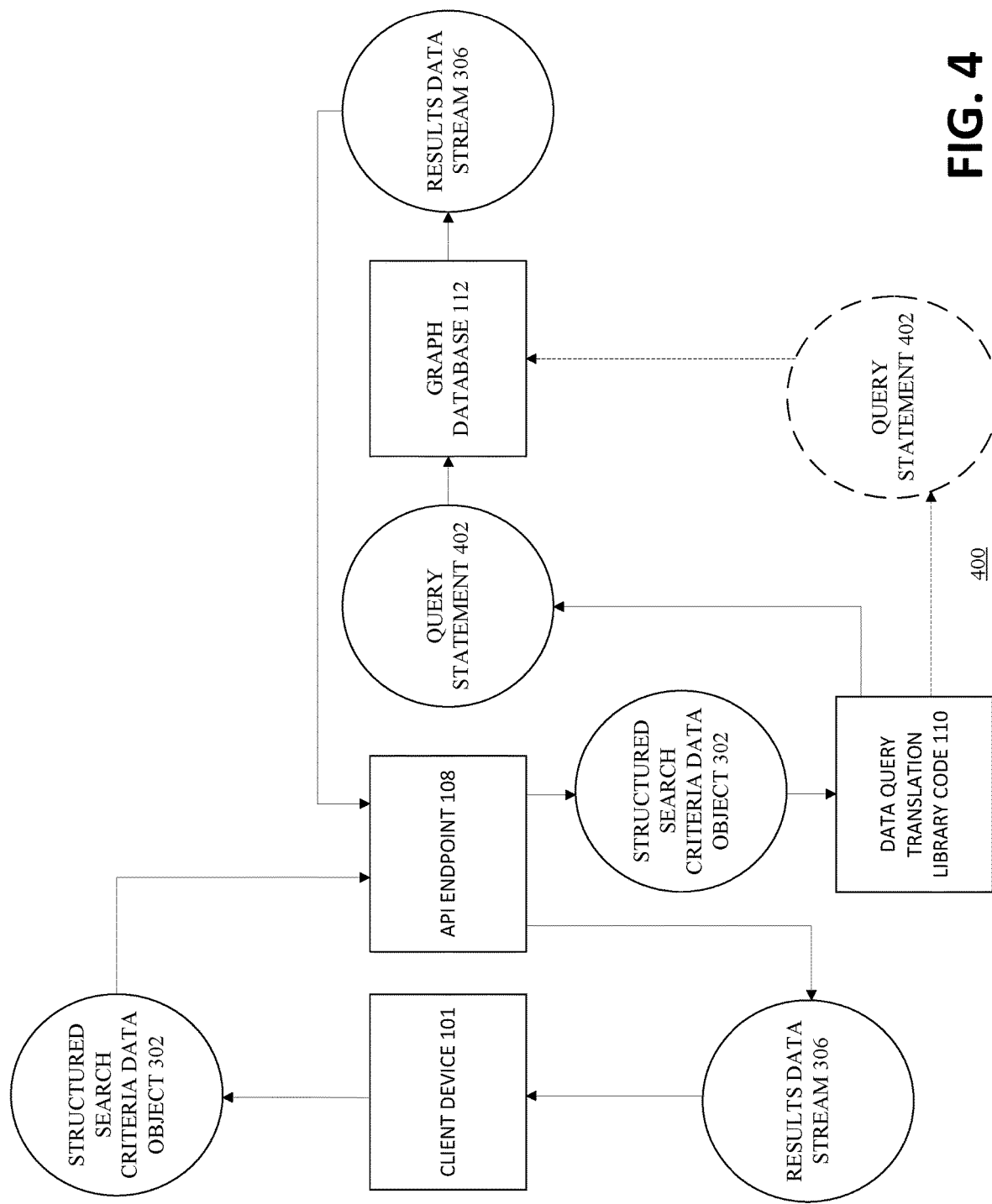
Figure 5:
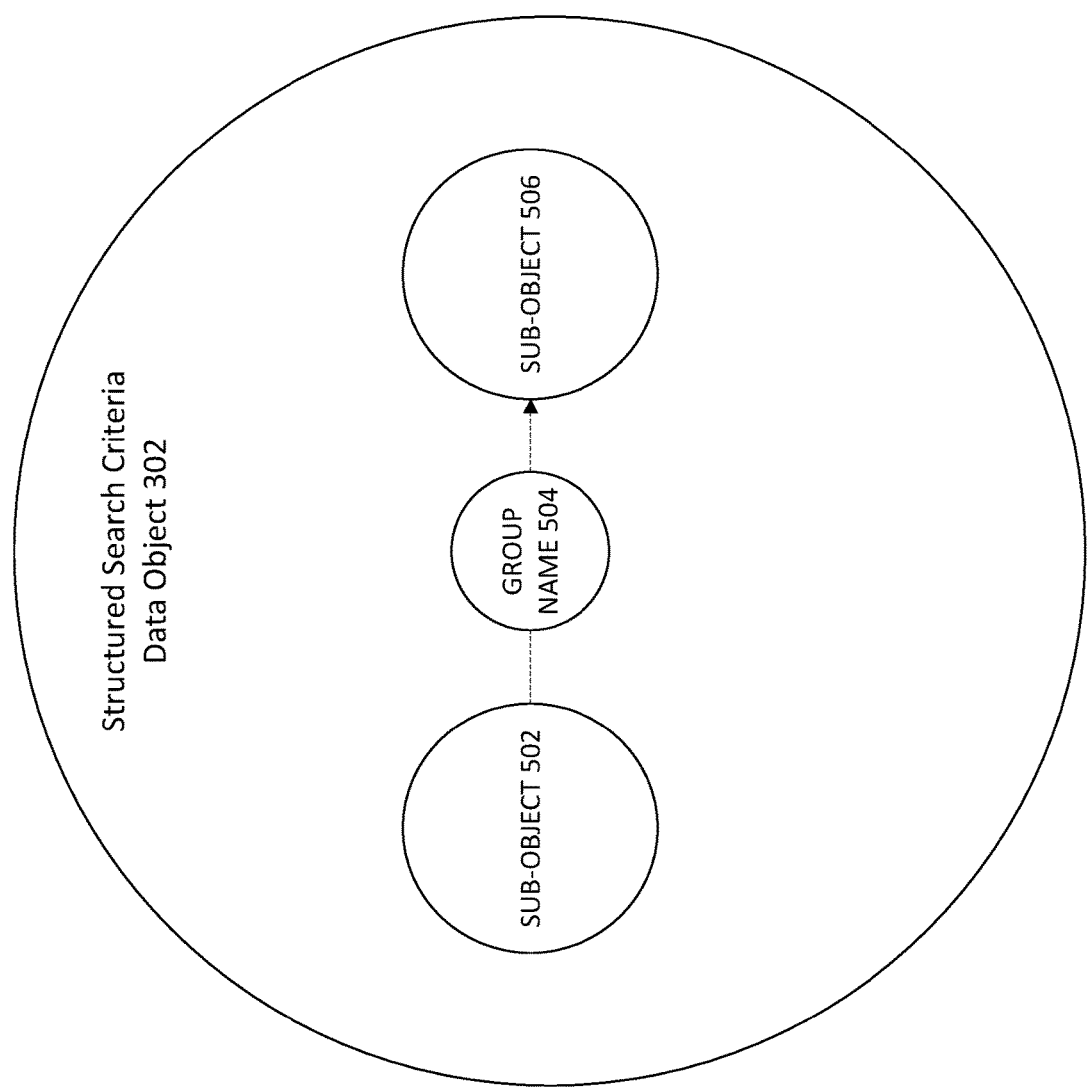
Figure 8:
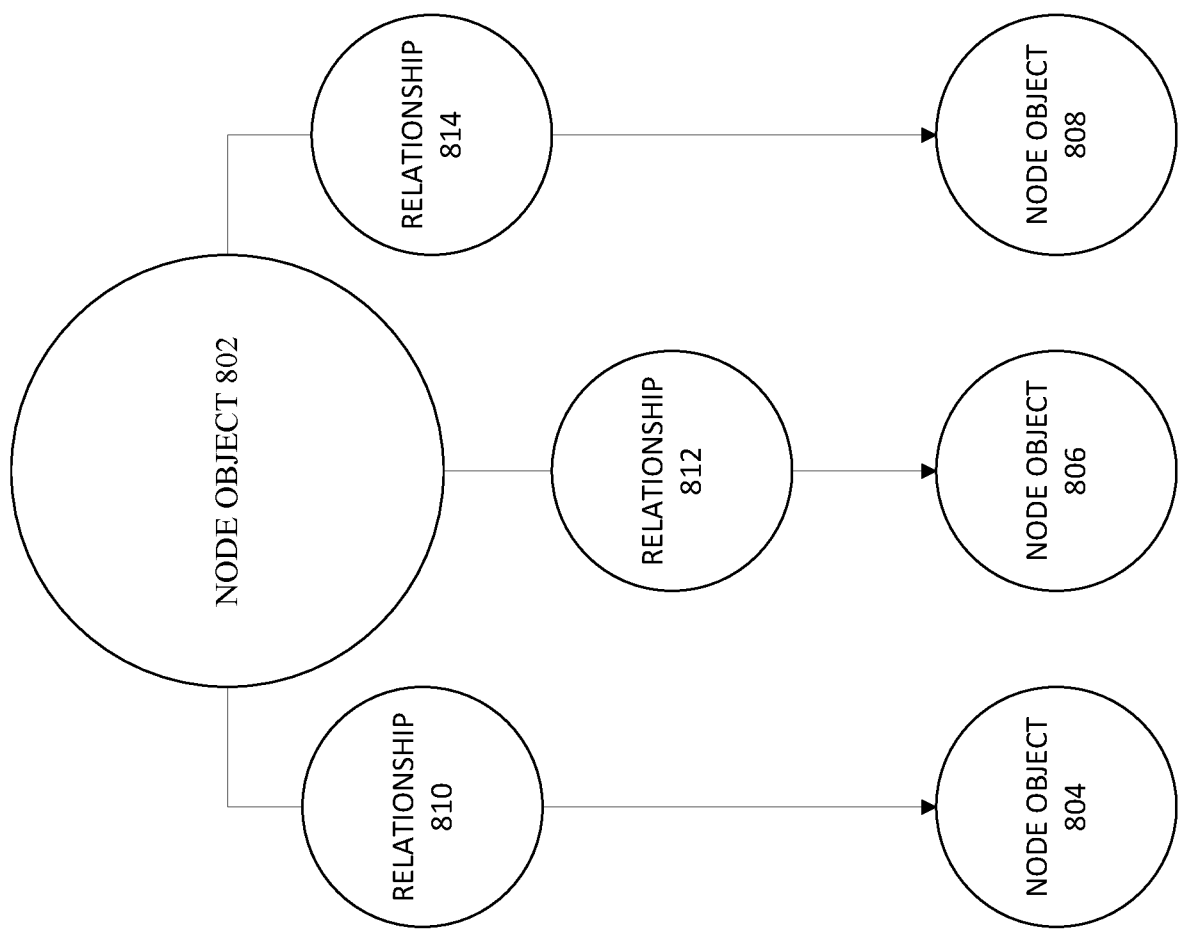
Figure 9:
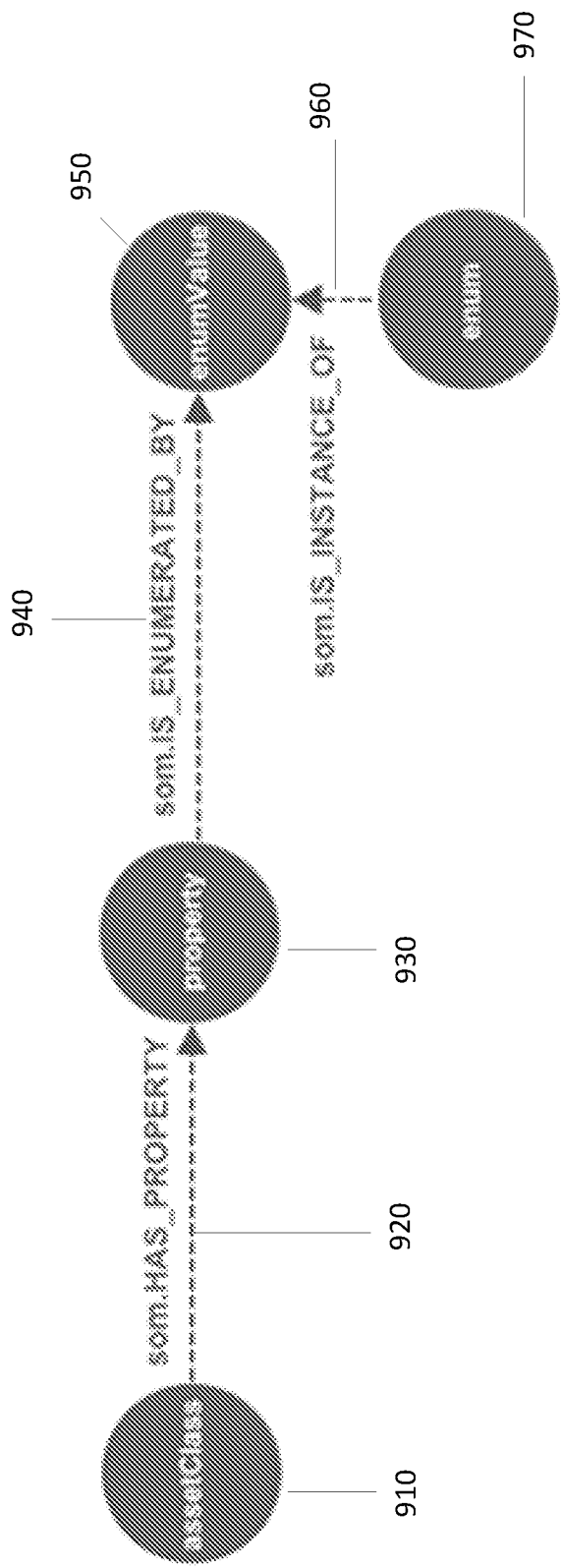
Figure 10:
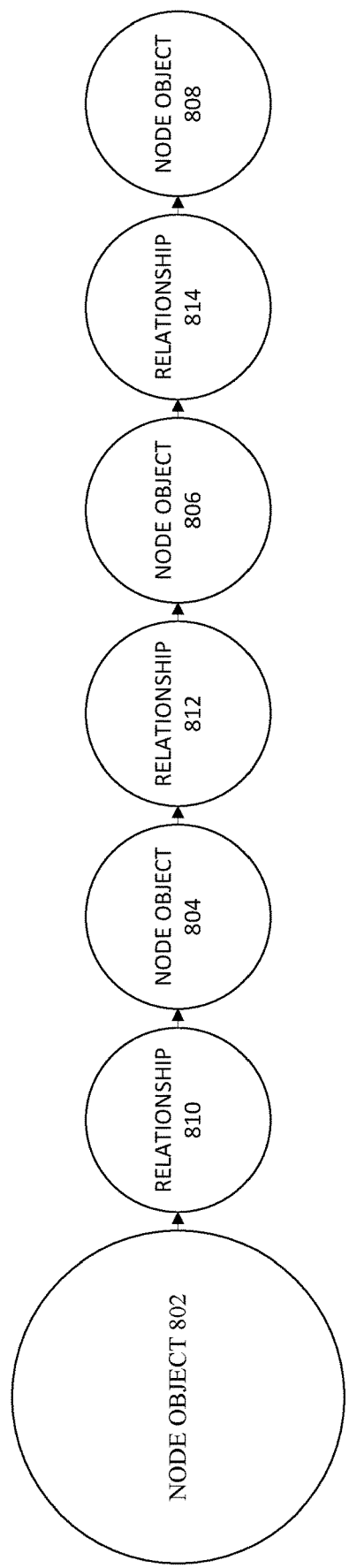
Figure 11:
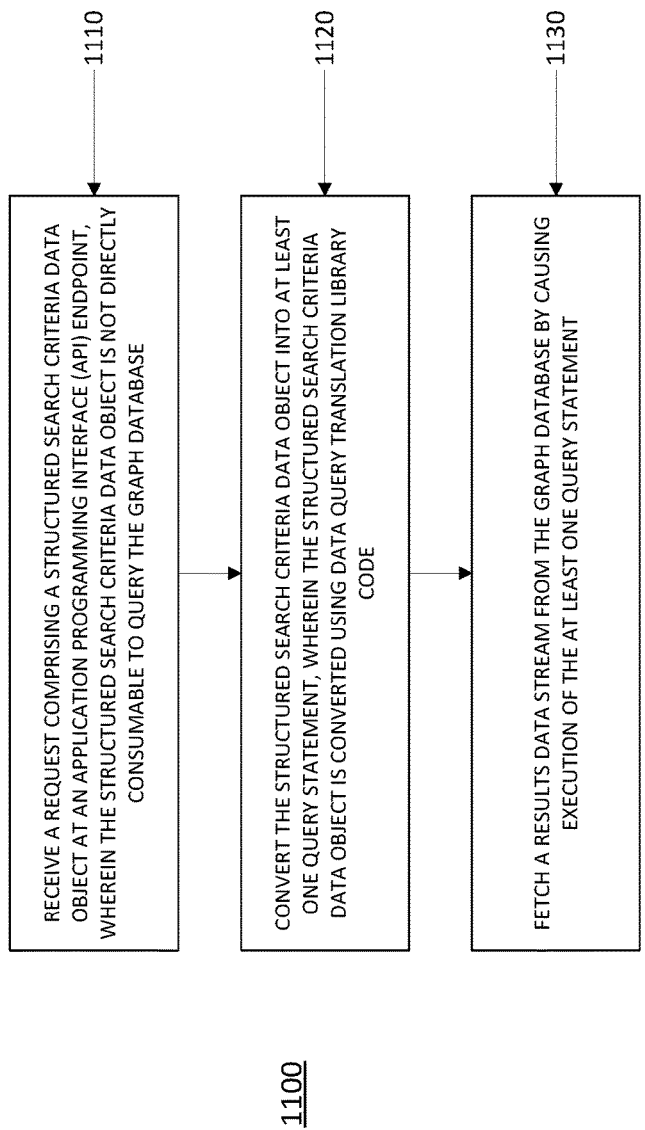

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with at least some example embodiments of the present disclosure;

FIG. 3 illustrates an example data flow in accordance with at least some example embodiments of the present disclosure;

FIG. 4 illustrates a detailed example data flow in accordance with at least some example embodiments of the present disclosure;

FIG. 5 illustrates an example data architecture of a structured search criteria data object in accordance with at least some example embodiments of the present disclosure;

FIG. 6 illustrates an example JSON data object in accordance with at least some example embodiments of the present disclosure;

FIG. 7 illustrates an example cypher query statement and results data in accordance with at least some example embodiments of the present disclosure;

FIG. 8 illustrates an example data architecture of a results data stream in a nested sub-graph format in accordance with at least some example embodiments of the present disclosure;

FIG. 9 illustrates an example results data stream 306 output in a nested sub-graph format;

FIG. 10 illustrates an example data architecture of a results data stream in a flat format in accordance with at least some example embodiments of the present disclosure;

FIG. 11 illustrates a flowchart depicting operations of an example process for fetching a results data stream from a graph database in accordance with at least some example embodiments of the present disclosure; and FIG. 12 illustrates a flowchart depicting operations of an example process for allowing access to an API endpoint.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, a non-extensible object model may not be sufficient to represent the data important to a particular user. For example, a system and/or a user may require particular custom data objects to represent assets or structures processed within a computing environment, where the custom data objects are not described by standard data objects provided by an object model. In an attempt to resolve these issues, some systems attempt to utilize an extendable object models that allows for customizable data objects that fits a desired use case. This can be beneficial for users with particular needs not accounted for in a standard object model.

An extendable object model comes with other unique technical difficulties as well. Often, when a user creates a custom data object in an extendable object model, there is no easy way to engage with the new custom data object within the object model, for example to facilitate searching or other querying associated with the custom data object. In this regard, even where an extensible object model is utilized and an end user may readily create custom data object(s) for representation within the extendable object model, interaction with such new custom data objects often requires additional engineering, manual upgrading of particular systems, and/or the like. In an extendable object model with lots of custom data objects created by users, such searching and/or other engagement becomes even more difficult. Oftentimes, personnel will have to create queries each time to facilitate searching of, retrieval of, and/or other data interaction with each new custom data object. A query statement may be needed to search for a first data object, and another query statement may be needed to search for a second data object in a particular relationship with the first data object, requiring additional manual-based engineering for each engagement to be handled associated with a custom data object. Additionally, each of these searches may need to be done at a different API endpoint. This creates a large load on both the system and personnel involved.

Embodiments of the present disclosure are directed to converting a structured data object of a first format into one or more query statements executable for searching a graph database. In some embodiments, with respect to an extensible object model, a particular data object may be designed, generated, and/or otherwise input. The structured data object is converted into any number of query statements using a data query translation library, which may convert the structured data object to such query statement(s) automatically. This eliminates the need for additional manual engineering to create the query statement for use each time a search is to be run for a new custom data object. Furthermore, in some embodiments, a plurality of sub-objects in the structured data object may be converted into a plurality of query statements accessible via a single API endpoint. In some embodiments, the query translation library performs conversion or other translation of a structured query data object into one or more query statements automatically upon inputting or other receiving of the structured data object. In this regard, utilization of an automatic data query translation library and/or conversion of a single structured data object into any number of query statements without individual manual engineering for each new custom data object. As such, a structured data object may be consumed and converted to appropriate query statements, enabling different structured data objects of the same format but that include different content to similarly enable execution of particular desired searching and/or interactions without requiring additional manual engineering of the system and/or updating to account for new custom data objects. Such utilization of an automatic data query translation library and/or conversion of structured data object(s) increase the efficiency and robustness of creating a search and consumes less system resources while simultaneously reducing deployment time and complexity. Embodiments of the present disclosure save time-to-deployment and resources associated with facilitating execution search a graph database.

In further embodiments of the present disclosure, a sub-object of the structured data object input may be specially configured in a manner that defines a name for a group resulting from a particular executed query within a structured data object. In some embodiments, the group name associated with a query corresponding to a sub-object may also be used in subsequent query defined by a second sub-object. Additionally, in some embodiments the result of a search from that sub-object will incorporate the results from the first sub-object. In some embodiments of the present disclosure, these searches may be performed via a single API endpoint, as opposed to multiple searches via multiple API endpoints that may be performed in conventional searching implementations. In this regard, some embodiments of the present disclosure eliminates the need for multiple API endpoints, further reducing the load on the system and personnel.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "extensible object model" refers to electronically managed data embodying a configuration of a data object and/or a collection of data objects that are generable, storable, processable, and/or otherwise interactable within a system, and that is configured to enable dynamic updating of object types represented in the configuration of data object(s). In one example context, an extensible object model includes different types of data object(s) representing real world and hypothetical assets and structures in which a user can create and customize assets and structures, and a user may create a custom data object represented in the data model. For example and without limitation, an extensible object model may contain data objects representing different buildings and/or sub-components or assets of such buildings.

The term "graph database" refers to any hardware, software, firmware, and/or combination thereof, embodying at least one repository that stores data object(s) of an extensible object model. In one or more embodiments, a graph database uses node objects and relationships that link node objects to store data in a graph structure. In one or more embodiments, a graph database is accessible via executed query statements to return data in one or more format(s) (for example and without limitation, a nested-subgraph format or flat format). In one or more example embodiments, a graph database comprises a Neo4j instance. In one or more embodiments, a graph database is searched in response to an executed cypher query statements. In one or more embodiments, a graph database is internal to an extensible object model. In various embodiments, a graph database is remote to an extensible object model.

The term "structured search criteria data object" refers to electronically-managed data configured that represents particular structured data value(s) that, alone or in relation to one another, is/are translatable to convert the data value(s) to search criteria embodying one or more query statement(s) for interacting with a graph database associated with an extensible object model. The data value(s) of a structured search criteria data object are not interpretable by a particular system directly to perform querying of a particular database without first converting the data to a structured search criteria data object may be in JavaScript Object Notation Format. In one or more embodiments, a structured search criteria data object may be configured to be input via an API endpoint. In one or more embodiments, a structured search criteria data object may indicate one or more data parameter(s) and/or types of node objects to search within a graph database. In other embodiments, a structured search criteria may indicate one or more types of node objects and one or more types of relationships to search within a graph database. In one or more embodiments, a structured search criteria data object comprises one or more sub-objects, each configured to execute a portion of a search of a graph database. In various embodiments, a structured search criteria data object is configured to name a results data stream resulting from a first sub-object. In further example embodiments, a structured search criteria data object is configured to use a name resulting from a first sub-object in a second sub-object. In various embodiments, a structured search criteria data object is configured in a manner that is convertible into one or a plurality of query statements.

The term "application programming interface endpoint" refers to a location digitally accessible via a computing system communicable with over a network, at which an application programming interface is communicable via a corresponding software program. In one or more embodiments, an API endpoint is configured to enable access to interaction with an extensible object model, such as Honeywell Forge. In one or more embodiments, an API endpoint is configured to communicate with a data query translation library code. In various embodiments, an API endpoint is configured to communicate with a graph database, for example embodying a Neo4j instance. In one or more embodiments, an API endpoint is configured to receive a structured search criteria data object. In some embodiments, the API endpoint includes or otherwise is embodied by one or more software applications that processes a [structured data object], translates the [structured data object] into one or more query statements, facilitates execution of the query statements, and provides access to the results of the executed query statements. For example, in some embodiments, the API endpoint includes, embodies, or otherwise accesses the data query translation library code, the graph database, and/or any software application(s) or program code that facilitates access to such data entities.

The term "query statement" refers to an executable set of instructions or code portion that, upon execution, facilitates retrieval of data or information from a database. In one or more embodiments, a query statement is a cypher statement. In one or more embodiments, a query statement is configured to search a graph database when executed.

The term "data query translation library code" refers to a set of one or more computer-implemented translation process(es) and/or instructions configured to receive a structured search criteria data object and convert data value(s) of the structured search criteria data object to output at least one corresponding query statement. In one or more embodiments, the data query translation library code parses the structured search criteria data object in order to determine if schema exists in a graph database. In one or more embodiments, after validating the structured search criteria data object, the data query translation library code converts the structured search criteria data object into one or more query statements. In one or more embodiments, the one or more query statements are output via the application programming interface endpoint. In one or more embodiments, the one or more query statements are then executed on the graph database by application layer. In certain embodiments, a data query translation library code is configured to receive a JSON data object and output one or more cypher query statements.

The term "results data stream" refers to any number of data record(s) returned from a search of a graph database, where such data records(s) are returned in response at one time, or asynchronously in an atomic manner across time, in response to successfully fetching the data object(s) in response to at least one executed query statement. In one or more embodiments, a results data stream is returned in a nested sub-graph format in which node objects are linked by relationships. In other embodiments, results data is returned in a flat format as node objects and relationships. In one or more embodiments, the results data stream is returned to a user overtime as the search continues to execute. In one or more embodiments, the results data stream is updated to incorporate new data over time.

The term "sub-object" refers to a data object that embodies part of a structured search criteria data object or node object. In one or more embodiments, a sub-object is a JSON data object. In one or more embodiments, a sub-object of a structured search criteria data object may correspond to a query statement returned after the structured search criteria data object is converted with a data query translation library code. In one or more embodiments, a sub-object of a structured search criteria data object may name a group of results data resulting from execution of a corresponding query statement. In one or more embodiments, a sub-object of a structured search criteria data object may contain a name corresponding to a group of results data resulting from execution of a different query statement.

The term "node object" refers to a data object represented in a graph database corresponding to a particular entity to be represented in the database. As a non-limiting example, a node object may correspond to a building. As another non-limiting example, a node object may correspond to a service alarm within a building.

The term "relationship" refers to a link represented in a graph database that correlates an association between at least two node object(s). As a non-limiting example, a relationship may correspond to the association between a building and a room within the building represented by two node objects.

The term "node matching" refers to a mechanism of searching a graph database for node objects based on matches between search parameter(s) and attribute value(s) of the node object(s). In a non-limiting example, searching for node objects may be constrained by a set of nodes, a set of property values, or a wherein clause.

The term "path matching" refers to a mechanism of searching a graph database for node objects using the relationships between the node objects, where the same relationship cannot be returned more than once in the same result record. In one or more example embodiments, the links between the nodes comprise relationships. In a non-limiting example, relationships comprise directions and lengths that can be used to constrain the number of results.

The term "nested sub-graph format" refers to electronically managed data of a results data stream comprising node objects configured to be linked to one another in a hierarchical format. In some embodiments, node objects in a nested sub-graph format are linked by relationship(s). As a non-limiting example, a node object representing a building may be linked by a relationship with a node sub-object representing a room in the building.

Example Systems and Apparatuses of the Disclosure

FIG. 1 illustrates a block diagram of a system that may be specially configured within which embodiments of the present disclosure may operate. Specifically, FIG. 1 depicts an example system 100. As illustrated, the system 100 includes at least one client device 101A-101N and a data management system 104 that comprises an extensible object model 106. Extensible object model further comprises an API endpoint 108 and a data query translation library code 110. In some embodiments, the data management system 104 is in communication with a graph database 112. In some embodiments, the data management system 104 and/or the client device 101A-101N are communicable over one or more communications network(s), for example the communications network 102.

It should be appreciated that the communications network 102 in some embodiments is embodied in any of a myriad of network configurations. In some embodiments, the communications network 102 embodies a public network (e.g., the Internet). In some embodiments, the communications network 102 embodies a private network (e.g., an internal, localized, or closed-off network between particular devices). In some other embodiments, the communications network 102 embodies a hybrid network (e.g., a network enabling internal communications between particular connected devices and external communications with other devices). The communications network 102 in some embodiments includes one or more base station(s), relay(s), router(s), switch(es), cell tower(s), communications cable(s) and/or associated routing station(s), and/or the like. In some embodiments, the communications network 102 includes one or more user controlled computing device(s) (e.g., a user owner router and/or modem) and/or one or more external utility devices (e.g., Internet service provider communication tower(s) and/or other devices.

Each of the components of the system communicatively coupled to transmit data to and/or receive data from another over the same or different wireless or wired networks embodying the communications network 102. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities communicating over the communications network 102, the various embodiments are not limited to this particular architecture. In other embodiments, one or more computing entities share one or more components, hardware, and/or the like, or otherwise are embodied by a single computing device such that connection(s) between the computing entities are over the communications network 102 are altered and/or rendered unnecessary.

The data management system 104 includes any number of computing device(s) that perform one or more function(s) for managing data in an extensible object model including storing data, communicating with a graph database, receiving requests comprising structured search criteria data objects, converting such structured search criteria data objects into query statements, and/or executing such query statements to search a graph database. In some embodiments, the data management system 104 includes an extensible object model 106 comprising an API endpoint 108 and data query translation library code 110. In one or more embodiments, graph database 112 may be a part of the data management system 104. In some embodiments, a separate system from the data management system 104 performs the function(s) for managing data in accordance with particular parameters.

The extensible object model 106 includes a configuration of a data object or a collection of data objects that are generable, sortable, processable, and/or otherwise interactable within data management system 104. In some embodiments, extensible object model 106 includes a configuration of a data object or a collection of data objects that are generable, sortable, processable, and/or otherwise interactable within a system external to data management system 104. In one or more embodiments, extensible object model 106 includes a collection of JavaScript Object Notation Format data objects configured to represent, for example and without limitation, physical or hypothetical assets and/or structures. In one or more embodiments, extensible object model 106 comprises at least one API endpoint 108 and data query translation code 110. In one or more embodiments, extensible object model 106 is configured to receive as input a structured search criteria data object and output a results data stream.

The API endpoint 108 includes a location digitally accessible via, for example and without limitation, the data management system 104 at which an API is communicable via a corresponding software program. In one or more embodiments, an API endpoint 108 is configured to access an extensible object model 106. In one or more embodiments, an API endpoint 108 is configured to communicate with data query translation library code 110. In one or more embodiments, an API endpoint is configured to receive as endpoint a request comprising a structured search criteria data object and initiate conversion of such structured search criteria data object via the data query translation library code 110. In one or more embodiments, API endpoint 108 is configured to communicate with graph database 112. In one or more embodiments, API endpoint allows access after a user is authenticated.

The data query translation library code 110 includes a set of at least one computer-implemented translation process(es) configured to receive data from, for example and without limitation, API endpoint 108 and convert data value(s) to output a corresponding query statement. For example and without limitation, data query translation library code 110 may receive a structured search criteria object from API endpoint 108 and output a corresponding query statement. As a non-limiting example, data query translation library code 110 may receive a JavaScript Object Notation Format data object from API endpoint 108 and output a cypher query. In one or more embodiments, data query translation library code 110 may be configured to execute a query statement. In one or more embodiments, data query translation library code 110 may be in communication with graph database 112. In one or more embodiments, data query translation library code 110 is part of extensible object model 106 within data management system 104. In alternative embodiments, data query translation library code 110 may be external to extensible object model 106 and/or data management system 104. In one or more embodiments, data query translation library code 110 is configured to convert a structured search criteria data object into a query statement that searches based at least in part on node matching. In one or more embodiments, data query translation library code 110 is configured to convert a structured search criteria data object into a query statement that searches based at least in part on path matching.

Graph database 112 includes any number of computing device(s), embodying at least one repository, that perform one or more function(s) for storing data object(s) of an object model, for example, extensible object model 106. In one or more embodiments, graph database 112 stores a variety of data including node objects and relationships. In one or more embodiments, node objects and relationships are stored in graph database 112 in a nested or hierarchical structure. In one or more embodiments, graph database 112 is accessible via executed query statements received from, for example and without limitation, data query translation library code 110, extensible object model 106, data management system 104, and/or API endpoint 108. In one or more embodiments, graph database 112 is configured to output a results data stream in response to receiving an executed query statement. In one or more embodiments, graph database 112 may receive an unexecuted query statement and execute the query statement. In one or more embodiments, graph database 112 is configured to output a results data stream in a nested sub-graph structure. In one or more embodiments, graph database 112 is configured to output a results data stream in flat structure comprising at least one node object and/or relationship. In one or more example embodiments, a graph database 112 is stored within a data management system 104 and/or extensible object model 106. In one or more embodiments, graph database 112 is remote to data management system 104 and/or extensible object model 106. In one or more embodiments, graph database 112 is internal to data management system 104 and/or extensible object model 106. In one or more embodiments, graph database 112 comprises a Neo4j instance.

Client device(s) 101A-101N includes one or more computing device(s) accessible to an end user. In some embodiments, the client device(s) 101A-101N comprise a personal computer, laptop, smartphone, tablet, Internet-of-Things enabled device, smart home device, virtual assistant, alarm system, and/or the like. The client device(s) 101A-101N may include a display, one or more visual indicator(s), on or more audio indicator(s), and/or the like that enables output to a user associated with the client device 101A-101N.

FIG. 2 illustrates a block diagram of an example apparatus that may be specially configured in accordance with at least some example embodiments of the present disclosure; Specifically, FIG. 2 depicts an example data management apparatus 200 specially configured in accordance with at least some example embodiments of the present disclosure. In some embodiments, the data management system 104 and/or a portion thereof is embodied by one or more system(s), such as the apparatus 200 as depicted and described in FIG. 2. The apparatus 200 includes processor 202, memory 204, input/output circuitry 206, communications circuitry 208, data intake circuitry 210, language translation circuitry 212, and data derivation circuitry 214. In some embodiments, the apparatus 200 is configured, using one or more of the sets of circuitry 202, 204, 206, 208, 210, 212, 214, and/or 216, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage the use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

In some example embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys, a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) and/or other hardware or software to cause transmission of signals via the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

The data intake circuitry 210 includes hardware, software, firmware, and/or a combination thereof that, that supports receiving data associated with or embodying a search request, for example, a structured search criteria data object. For example, in some embodiments, data intake circuitry 210 includes hardware, software, firmware, and/or a combination thereof, that receives a JavaScript Object Notation Format data object. Additionally or alternatively, the data intake circuitry 210 may communicate with client device 101A-101N, data management system 104, extensible object model 106, and/or API endpoint 108. Additionally or alternatively, in some embodiments, the data intake circuitry 210 includes hardware, software, firmware, and/or a combination thereof, that requests data from one or more client devices 101A-101N, data management system 104, and/or extensible object model 106. Additionally or alternatively, in some embodiments, the data intake circuitry 210 includes hardware, software, firmware, and/or a combination thereof, configured to receive and/or extract a name from a first sub-object of a structured search criteria data object and used in a second sub-object of the structured search criteria data object. Additionally or alternatively, in some embodiments, the data intake circuitry 210 includes hardware, software, firmware, and/or a combination thereof, that authenticates a user before allowing access to an API endpoint, for example embodied by API endpoint 108. In some embodiments, data intake circuitry 210 includes a separate processor, specially configured field programmable gate array (FPGA), or a specially programmed application specific integrated circuit (ASIC).

Language translation circuitry 212 includes hardware, software, firmware, and/or a combination thereof that supports translating data associated with a search request and converting it to a corresponding query statement. For example, in some embodiments, the language translation circuitry includes hardware, software, firmware, and/or a combination thereof, that converts a structured search criteria data object to any number query statement(s). Additionally or alternatively, the language translation circuitry 212 may communicate with API endpoint 108, data query translation library code 110, graph database 112, extensible object model 106, and/or data management system 104. Additionally or alternatively, in some embodiments, the language translation circuitry 212 includes hardware, software, firmware, and/or a combination thereof, that converts a first sub-object of a structured search criteria data object and/or a second sub-object of a structured search criteria data object to corresponding at least one query statement. In some embodiments, the language translation circuitry 212 includes hardware, software, firmware, and/or a combination thereof, that converts a portion of a structured search criteria data object, for example a first sub-object, where the first sub-object contains a name given to a group resulting from an executed query statement corresponding to second sub-object of a structured search criteria data object, to a query statement that when executed, returns results data incorporating the results data of the query statement corresponding to the second sub-object. Additionally or alternatively, in some embodiments, the language translation circuitry 212 includes hardware, software, firmware, and/or a combination thereof, that converts a sub-object of a structured search criteria data object to a query statement that searches based at least in part on node matching. Additionally or alternatively, in some embodiments, the language translation circuitry 212 includes hardware, software, firmware, and/or a combination thereof, that converts a sub-object of a structured search criteria data object to a query statement that is configured to initiate a search based at least in part on path matching. Additionally or alternatively, in some embodiments, the language translation circuitry 212 includes hardware, software, firmware, and/or a combination thereof, that converts a structured search criteria data object into a plurality of query statements. Additionally or alternatively, in some embodiments, the language translation circuitry 212 includes hardware, software, firmware, and/or a combination thereof, that converts a JavaScript Object Notation format data object into a query statement. Additionally or alternatively, in some embodiments, the language translation circuitry 212 includes hardware, software, firmware, and/or a combination thereof, that converts a structured search criteria data object into a cypher query. In some embodiments, the language translation circuitry 212 includes a separate processor, specially configured field programmable gate array (FPGA), or a specially programmed application specific integrated circuit (ASIC).

The data derivation circuitry 214 includes hardware, software, firmware, and/or a combination thereof, that supports various functionality associated with returning a results data stream from a graph database. In some embodiments, the data derivation circuitry 214 includes hardware, software, firmware, and/or a combination thereof, that executes a query statement to search a graph database. Additionally or alternatively, the data derivation circuitry 214 may communicate with client device(s) 101A-101N, API endpoint 108, data query translation library code 110, graph database 112, extensible object model 106, and/or data management system 104. Additionally or alternatively, in some embodiments, the data derivation circuitry 214 includes hardware, software, firmware, and/or any combination thereof, that cause execution of at least one query statement to return a results data stream from a graph database, or otherwise facilitates execution of the at least one query statement to return a results data stream from the graph database. Additionally or alternatively, in some embodiments, the data derivation circuitry 214 includes hardware, software, firmware, and/or any combination thereof, that maintains a socket or other connection that enables ongoing provision of data objects via a results data stream. Additionally or alternatively, in some embodiments, the data derivation circuitry 214 includes hardware, software, firmware, and/or any combination thereof, that structures data for return via a results data stream. Additionally or alternatively, in some embodiments, the data derivation circuitry 214 includes hardware, software, firmware, and/or any combination thereof, that returns results in a nested sub-graph format. Additionally or alternatively, in some embodiments, the data derivation circuitry 214 includes hardware, software, firmware, and/or any combination thereof, that returns results in a flat format comprising at least one node object or relationship. Additionally or alternatively, in some embodiments, the data derivation circuitry 214 includes hardware, software, firmware, and/or any combination thereof, that updates a results data stream with new data over time. Additionally or alternatively, in some embodiments, the data derivation circuitry 214 includes hardware, software, firmware, and/or any combination thereof, that fetches a results data stream based at least in part on a limit of a number of data objects indicated by a user. Additionally or alternatively, in some embodiments, the data derivation circuitry 214 includes hardware, software, firmware, and/or any combination thereof, that fetches a results data stream based at least in part on a limit of a number of data objects determined based at least in part on identification of a requesting application corresponding to the request. In some embodiments, the data derivation circuitry 214 includes a separate processor, specially configured field programmable gate array (FPGA), or a specially programmed application specific integrated circuit (ASIC).

Additionally or alternatively, in some embodiments, two or more of the sets of circuitries 202-214 are combinable. Alternatively or additionally, in some embodiments, one or more sets of circuitry perform some or all of the functionality described associated with another component. For example, in some embodiments, two or more of the sets of circuitry 202-214 are combined into a single module embodied in hardware, software, firmware, and/or a combination thereof. Similarly, in some embodiments, one or more of the sets of circuitry, for example the data intake circuitry 210, the language translation circuitry 212, and/or the data derivation circuitry 214, is/are combined with the processor 202, such that the processor 202 performs one or more of the operations described above with respect to each of these sets of circuitry 202-214.

Example Data Flows and Data Architectures of the Disclosure

Having described example systems and apparatuses in accordance with embodiments of the present disclosure, example data flows and architectures of data in accordance with the present disclosure will now be discussed. In some embodiments, the systems and/or apparatuses described herein maintain data environment(s) that enable the data flows in accordance with the data architectures described herein. For example, in some embodiments, the systems and/or apparatuses described herein function in accordance with the data flow depicted in FIGS. 3-4, and the data architectures depicted and/or described with respect to FIGS. 5-7 are maintained via, for example, client device(s) 101A-101N, data management system 104, and/or graph database 112.

FIG. 3 illustrates an example data flow in accordance with at least some example embodiments of the present disclosure. Specifically, FIG. 3 depicts a flow of data between the various computing devices depicted and described in FIG. 1.

In some embodiments, client device 101 transmits a request comprising a structured search criteria 302 to a central system 304 for processing. Client device 101 may comprise any of client devices 101A-101N as depicted in FIG. 1, as well as other user or client devices. In one or more embodiments, client device 101 may authenticate a user prior to transmitting a request. In some embodiments, the request includes or embodies a HTTP REST request transmitted to the central system 304 via a particular API endpoint. In some embodiments, the client device 101 transmits the request in response to user engagement with the central system 304 via the client device 101. For example, in some embodiments, a user of the client device 101 interacts with a user-facing application executed on the client device 101 that provides access to particular functionality for searching and/or otherwise interacting with a particular database, such functionality performed at least in part by the central system 304.

A structured search criteria data object 302 may comprise one or more sub-objects. In one or more embodiments, a first sub-object of structured search criteria data object 302 indicates a name for a group of results data associated with the first-sub object. In one or more embodiments, a second sub-object of structured search criteria data object 302 incorporates the name indicated by first sub-object. In one or more embodiments, one or more sub-objects of a structured search criteria data object 302 describe node matching. In one or more embodiments, one or more sub-objects of a structured search criteria data object 302 describe path matching. In one or more embodiments, one or more sub-objects of a structured search criteria data object 302 describe a nested sub-graph format of a results data stream. In one or more embodiments, one or more sub-objects of a structured search criteria data object 302 describe a flat format of a results data stream. In one or more embodiments, structured search criteria data object 302 is a JavaScript Object Notation formatted data object.

In one or more embodiments, the structured search criteria data object 302 describes the shape of the data to be searched for. In one or more embodiments, structured search criteria data object 302 comprises a where clause that allows a user to add constraints to a search pattern. In one or more embodiments, structured search criteria data object 302 describes a search pattern to match. In one or more embodiments, structured search criteria data object 302 comprises a key value pair of a string and an object. In this example embodiment, optional parameters allow a user to apply conditional match in a query. In further embodiments, structured search criteria data object 302 comprises conditional values inline. In one or more embodiments, structured search criteria data object 302 includes a list of node properties to include or exclude in a query. For example and without limitation, the list of node properties to include or exclude may comprise a string array. In one or more embodiments, structured search criteria data object 302 describes a language code used for filtering. In one or more embodiments, language may be specified with an enum data object. In one or more embodiments, structured search criteria data object 302 may describe node matching with Boolean expressions, operands, and/or where clauses. In one or more embodiments, results data stream 306 returned from node matching are available as bound pattern elements. In one or more embodiments, bound pattern elements returned in results data stream 306 may be used for pattern patching of paths or in a further match clause. In one or more embodiments, structured search criteria data object 302 may describe path matching constrained by a where clause, length of relationships, and/or direction of relationships. In one or more embodiments, structured search criteria data object 302 may comprise a date object or a time object. In one or more embodiments, structured search criteria data object 302 may comprise a variable name and/or a property name. In one or more embodiments, a variable name refers to the name of a variable that refers to a node or relationship in a match. In one or more embodiments, a property name is a fully qualified name of a property that is applicable to a node object or property that is referenced by a variable name. In one or more embodiments, structured search criteria data object 302 may comprise a duration object representing an amount of time. In one or more embodiments, structured search criteria data object 302 may represent a map object describing a map from strings to values.

In one or more embodiments, structured search criteria data object 302 may be received by a central system 304. In one or more embodiments, central system 304 comprises, for example and without limitation, data management system 104, extensible object model 106, API endpoint 108, data query translation library code 110, and graph database 112. In one or more embodiments, central system 304 is configured to convert structured search criteria object 302 into one or more query statements. In one or more embodiments, central system 304 is configured to convert structured search criteria data object 302 into a plurality of query statements. In one or more embodiments, central system 304 converts a sub-object of structured search criteria data object 302 into a query statement that searches based at least on node matching. In one or more embodiments, central system 304 converts a sub-object of structured search criteria data object 302 into a query statement that searches based at least on path matching. In one or more embodiments, central system 304 converts a sub-object of structured search criteria data object 302 into a query statement that searches based at least on node matching or path matching in addition to other conditions. In one or more embodiments, central system 304 may convert a structured search criteria data object to one or more query statements, execute such query statements, and search an internal or external graph database based on node matching or path matching. In one or more embodiments, central system 304 converts a structured search criteria data object 304 into a cypher query statement and executes such statement to search an internal or external graph database based on node matching or path matching. In one or more embodiments, central system 304 may return a results data stream 306.

In one or more embodiments, results data stream 306 comprises a one time response of a number of data objects returned from a search of a graph database. In one or more embodiments, results data stream 306 comprises a number of data objects returned asynchronously across time. In one or more embodiments, results data stream 306 is updated with new data objects overtime as a search continues to execute. In one or more embodiments, results data stream 306 is returned in a nested sub-graph format comprising node objects linked by relationships. In one or more embodiments, results data stream 306 is returned in a flat format as at least one node object or data object. In one or more embodiments, results data stream 306 is returned based at least in part on a limit of a number of data objects indicated by a user. In one or more embodiments, results data stream 306 is returned based at least in part on a limit of a number of data objects determined based at least in part on identification of a requesting application corresponding to the request.

FIG. 4 illustrates a detailed example data flow in accordance with at least some example embodiments of the present disclosure. Specifically, FIG. 4 depicts a detailed flow of data between the various computing devices depicted and described in FIG. 1.

In some embodiments, client device 101 transmits a request comprising a structured search criteria 302 via an API endpoint 108. Client device 101 may comprise any of client devices 101A-101N as depicted in FIG. 1, as well as other user or client devices. In one or more embodiments, client device 101 may authenticate a user prior to transmitting a request.

Structured search criteria data object 302 may be input via an API endpoint 108. Although structured search criteria data object 302 may comprises a plurality of sub-objects, in an example embodiment, structured search criteria data object 303 is received at a single API endpoint 108. In one or more embodiments, API endpoint 108 is in communication with data query translation library code 110. In one or more embodiments, API endpoint 108 and data query translation library code 110 are internal to an extensible object model 106. In alternative embodiments, one or both of API endpoint 108 and data query translation library code 110 are external to an extensible object model 106. In one or more example embodiments, API endpoint 108 is configured to receive a structured search criteria object 302 comprising a first sub-object indicating a name for a group resulting from a first associated query and a second-sub object including a name to be used in a second associated query. In one or more embodiments, API endpoint 109 is configured to receive a JavaScript Object Notation Format data object. An API endpoint may receive a data object configured to In one or more embodiments, API endpoint 108 transmits the structured search criteria data object 302 to data query translation code for processing. Data query translation library code 110 is configured to convert structured criteria data object 302 into one or more query statements 402. As depicted in FIG. 4, structured search criteria data object 302 is converted into at least one query statement, but may be converted into a plurality of query statements. It should be appreciated that the data query translation library code may embody a particular rule set, specially trained model, or other code instructions that perform conversion of a particular structured language into corresponding executable query statement(s).

In one or more embodiments, data query translation library code 110 is configured to convert a structured search criteria data object into one or more cypher statements. In one or more embodiments, data query translation library code 110 is configured to convert a sub-object of a structured search criteria data object into a query statement 402 that when executed will search based at least in part on node matching. In one or more embodiments, data query translation library code 110 is configured to convert a sub-object of a structured search criteria data object into a query statement 402 that when executed will search based at least in part on path matching. In one or more embodiments, data query translation library code 110 is configured to convert a structured search criteria data object into one or more query statements without further input from the user.

In one or more embodiments, the at least one query statement 402 is transmitted to graph database 112. Graph database 112 may be internal or external to a data management system 104. In one or more embodiments, graph database 112 may comprise a Neo4j instance. In one or more embodiments, graph database 112 may comprise node objects linked by relationships. In one or more embodiments, graph database 112 represents structures, buildings, and assets. For example and without limitation, the at least one query statement 402 may be configured to search for service alarms contained within fire stations in a certain zip code. In one or more embodiments, query statements 402 may be configured to search graph database 112 using node matching or path matching. In one or more embodiments, query statements 402 may specify a limit of an amount of data objects in a results data stream 306 based on an indication from a user or a requesting application. In one or more embodiments, graph database 112 is configured to execute a query statement.

In one or more embodiments, results data stream 306 is delivered in real-time via an API endpoint 108. In one or more embodiments, API endpoint 108 transmits the results data stream 306 a client device 101. In one or more embodiments, the results data stream 306 comprises an unordered sequence of maps with key-value pairs. In one or more embodiments, node objects returned by node matching are available as bound pattern elements and can be used for pattern matching of paths or in any further match clauses. In one or more embodiments, API endpoint 101 transmits the results data stream 306 in real time to client device 101. This is technically advantageous because a user of a client device 101 can see results as they come in, rather than waiting for all results to be returned at once. Streaming results over time allows the system to avoid crashing or slowness. In alternative embodiments, results data stream 306 may be returned in a batch at once. This may be advantageous for a user wishing to see a full picture of data.

In one or more embodiments, the results data stream 306 is output to a client device 101 such as a laptop, tablet, or smartphone. In one or more embodiments, data is output to a client device user interface. In one or more embodiments, sub-graphs are streamed to a client device reflecting structures such as, for example and without limitation, buildings and floors. In one or more embodiments, the client device 101 may be configured to allow access to the results data stream 306 to particular users. In one or more embodiments, the results data stream 306 is transmitted to the client device 101 indirectly.

FIG. 5 illustrates an example data architecture in accordance with at least some example embodiments. Specifically, FIG. 5 illustrates a data architecture for a structured search criteria data object 302 in accordance with at least some embodiments of the present disclosure. In this regard, any request data received, transmitted, generated, and/or otherwise manipulated via the systems described herein may be architected in accordance with the depicted data architecture to include the particular data values therein.

As illustrated, structured search criteria data object 302 comprises a first data sub-object 502 and a second sub-object 506. It should be noted that a structured search criteria data object 302 may contain less than two data sub-objects and may contain more than two data sub-objects, and the amount of sub-objects depicted in the figure are for illustration purposes only.

In one or more embodiments, each of data sub-objects 502 and 506 are configured to be converted into individual query statements by data query translation code 110. Sub-objects 502 and 506 may be converted into query statements that search based on path matching, node matching, or the like. In one or more embodiments, whether a query statement should search based on path matching or node matching is described by the sub-object 502 and/or 506.

In one or more embodiments, a sub-object, for example sub-object 502, may describe a group name 504 for a results data stream resulting from the sub-object. For example and without limitation, sub-object 502 may describe a search for buildings with three floors. In this example embodiment, sub-object 502 is converted to a query statement that when executed, searches a graph database for buildings with three floors. Sub-object 502 may specify group name 504 for this result set to be "ThreeFloorBuildings".

In one or more embodiments, a sub-object, for example sub-object 506, may use a group name 504 for a different sub-object. For example and without limitation, sub-object 506 may describe a search for "ThreeFloorBuildings" that contain a boiler. In this example embodiment, sub-object 504 may then be converted to a query statement by data query translation code 110. In this example embodiment, the query statement is then executed and the "Three Floor Buildings" group is searched for those that contain a boiler.

In this and other embodiments, both sub-objects are input via a single API endpoint 108 and a search is conducted based on this input. In previous methods, searches would need to be run on multiple API endpoints in order to return these results. The current disclosure provides technical advantages by reducing system and personnel load through conducting multiple searches at a single API endpoint, including those incorporating results from another search.

FIG. 6 depicts an example structured search criteria data object 600 in JSON format. This example JSON data object 600 describes a node match query with conditional filtering. This example is given for illustration purposes only and is not limiting in anyway. A number of other data formats may be used as well as a number of different searches resulting from a number of different formats.

Line 610 of FIG. 6 illustrates a query type described in JSON data object 600. In this example embodiment, the type of query is set to node matching. In alternative embodiments, the type of query may be set to path matching.

Line 620 of JSON data object 600 describes a label of node data objects that will be matched with in a query search. In this example embodiment, classNames is set to iot.PhysicalPoint. As a result of a search resulting from this example data object, a results data stream will return nodes that have a label of iot.PhysicalPoint.

Line 630 of JSON data object 600 provides a variable name, "point". Any number of text strings or other values may be input into variableName, and these variable names may be incorporated into other sub-objects of a structured search criteria data object. For example, the variable name "point" may be used for path matching or filtering with property in another search based on the results of the example search.

In this example embodiment, the JSON data object 600 conditionally filters for node objects with a specified GUID. In this example embodiment, the search conditionally filters for node objects that have a GUID value of 90c3a4e9-7fb8-4855-88el-b971bd4dc6f4. As shown, line 640 specifies a property name of som.guid as part of a property operand, specifying that the search is looking for node objects with GUIDs. Operator 650 in this example embodiment is set to equals, and line 660 gives a value of 90c3a4e9-7fb8-4855-88el-b971bd4dc6f4 as part of a value operand. In this example embodiment a query statement searching based on this JSON data object 600 would filter for node objects that have a property GUID equal to value 90c3a4e9-7fb8-4855-88el-b971bd4dc6f4. It should be noted that a JSON object may contain no conditional filtering or other types of conditions, and the illustration here is given for explanatory purposes only.

In other example embodiments, a JSON object may specify a query of path matching. In one or more embodiments, a JSON object may comprise parameters for relationship names, minimum lengths, maximum lengths, and other parameters. In one or more embodiments, a JSON object specifies path matching and multiple relationships. In one or more embodiments, path matching with multiple relationships allows the search to skip intermediate nodes and return a desired set of nodes. This is technically advantageous in that it returns less irrelevant data to the user.

FIG. 7 illustrates an example search 700 that results from JSON data object 600. In this example embodiment, the JSON data object is input via an API endpoint and converted by a data query translation library code. In this example embodiment, as a result of the translation, cypher query 710 is output. Query statement 710 specifies node matching for nodes labeled iot.PhysicalPoint with variable name "point" and uses a where clause to search for node objects where a GUID value is 90c3a4e9-7fb8-4855-88el-b971bd4dc6f4.

In this example embodiment, Cypher query 710 is configured to run the node matching search using conditional filtering set out above. In an example embodiment, cypher query 710 is executed by a graph database. For example and without limitation, cypher query 710 may be executed by Neo4j and search for matching nodes. In this example embodiment, response 720 is returned as a result of the search.

FIG. 8 illustrates an example data architecture in accordance with at least some example embodiments of the present disclosure. Specifically, FIG. 8 illustrates a data architecture for a results data stream returned in a nested sub-graph format. In this regard, any results data received, transmitted, generated, and/or otherwise manipulated via the systems described herein may be architected in accordance with the depicted data architecture to include the particular data values herein.

As illustrated, results data may be returned in a nested sub-graph format. For example, results data stream 306 as illustrated in previous figures may be returned in the format depicted in FIG. 8.

As illustrated, results data may be returned as node objects that are linked by relationships. For example and without limitation, node object 802 may be linked to node objects 804-808 by relationships 810-814. Relationships 810-814 may represent any of a number of links between node objects. For example, node objects 804-808 may be sub-node objects of node object 802. In one or more embodiments, relationships 810-814 may describe that node objects 804-808 are components of node object 802. Additionally or alternatively, relationships 804-808 may describe a hierarchical relationship, for example and without limitation a hallway and rooms in such hallway. Additionally or alternatively, relationships 810-814 may represent a non-hierarchical relationship, for example and without limitation, a relationship between a fire alarm and a glass break alarm.

In one or more embodiments, results data stream 306 may return data in a single sub-graph format, with all returned node objects linked by relationships. In one or more embodiments, results data stream 306 may return multiple sub-graphs over time, with different sub-graphs not necessarily being linked by relationships. In one or more embodiments, results data stream 306 may consist of one or more sub-graphs along with one or more individual node objects or relationships.

Returning results data in a hierarchical format may provide technical advantages. For example, an end user may find it advantageous to see the relationships between node objects when reading results data, allowing for easier understanding of the data and the relationships between the data.

FIG. 9 illustrates an example results data stream 306 output in a nested sub-graph format. In one or more embodiments, node object 910 represents an asset class. In one or more embodiments, node 930 represents a property. In one or more embodiments, when results data stream 306 is returned in a nested sub-graph format, node object 910 and node object 930 are linked by relationship 920. In one or more embodiments, relationship 920 describes that the asset class represented by node object 910 has a property that is represented by the node object 930.

In one or more embodiments, node 970 represents an enumeration class. In one or more embodiments, node object 950 represents an enumeration value. In one or more embodiments, when results data stream 306 is returned in a nested sub-graph format, node object 970 and node object 950 are linked by relationship 960. In one or more embodiments, relationship 960 describes that the enumeration value represented by node object 950 is an instance of the enumeration class represented by node object 970. In one or more embodiments, node object 950 is linked to node object 930 by relationship 940. In one or more embodiments, relationship 940 describes that the property represented by node 930 is enumerated by the enumeration value represented by node 950. In some embodiments, relationship(s), for example relationship 920, is embodied by one or more data object(s) specially configured to include particular data properties that define the relationship between the two nodes corresponding to two data objects, for example nodes 910 and 930.

FIG. 10 illustrates an example data architecture in accordance with at least some example embodiments of the present disclosure. Specifically, FIG. 10 illustrates a results data stream 306 returned in a flat format. In this regard, any results data received, transmitted, generated, and/or otherwise manipulated via the systems described herein may be architected in accordance with the depicted data architecture to include the particular data values therein.

As illustrated, results data may be returned in a flat format. For example, results data stream 306 as illustrated in previous figures may be returned in the format depicted in FIG. 10.

As illustrated, results data may be returned as a series of node objects and relationships without linking. For example, results data stream 306 may comprise node objects 802-808 and relationships 810-814 separately without connection or linkage. In one or more embodiments, relationships 810-814 describe a hierarchical relationship between two node objects (e.g., a component relationship), but such node objects are not linked by the relationships. In one or more embodiments, node objects may still be hierarchical in nature (e.g., a building and a floor on such building) but not be linked by relationships.

Returning results data in a flat format may provide technical advantages to an end user. For example and without limitation, a user might receive results data at a quicker pace if the system is configured to return whichever relationships and/or node objects are found first in a search. In one or more embodiments, an end user is later able to put together the node objects and relationships based on descriptions of such objects.

Example Processes of the Disclosure

Having described example systems and apparatuses, data architectures, data flows, and graphical representations in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. Similarly, it should be appreciated that one or more of the operations of each flowchart may be combinable, replaceable, and/or otherwise altered as described herein.

FIG. 11 illustrates a flowchart depicting operations of an example process for fetching a results data stream from a graph database in accordance with at least some example embodiments of the present disclosure. Specifically, FIG. 11 depicts operations of an example process 1100. In some embodiments, the process 1100 is embodied by a computer program code stored on a non-transitory computer-readable storage medium of a computer program product configured for execution to perform the process as depicted and described. Alternatively or additionally, in some embodiments, the process 1100 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, process 1100 is described as performed by and from the perspective of the apparatus 200.

The process 1100 begins at operation 1110. At operation 1110, the apparatus 200 includes means such as the data intake circuitry 210, the language translation circuitry 212, the data derivation circuitry 214, the communications circuitry 208, the input/output circuitry 206, the processor 202, and or the like, or a combination thereof, that receives a request comprising a structured search criteria data object at an API endpoint, wherein the structured search criteria data object is not directly consumable to query a graph database. In one or more embodiments, the graph database is configurable via an extensible object model. In one or more embodiments, the structured search criteria comprises one or more sub-objects. In one or more embodiments, the structured search criteria comprises a JSON data object. In one or more embodiments, the apparatus 200 is configured to receive at least one name of at least one group resulting from a first sub-object of the structured search criteria data object, wherein the at least one name is used in a second sub-object of the structured search criteria data object.

At operation 1120, the apparatus 200 includes means such as the data intake circuitry 210, the language translation circuitry 212, the data derivation circuitry 214, the communications circuitry 208, the input/output circuitry 206, the processor 202, and or the like, or a combination thereof, that converts the structured search criteria data object into at least one query statement, wherein the structured search criteria data object is converted using data query translation library code. In one or more embodiments, a sub-object of the structured search criteria data object is converted into a query statement that searches based at least on node matching. In one or more embodiments, a sub-object of the structured search criteria data object is converted into a query statement that searches based at least on path matching. In one or more embodiments, the structured search criteria data object is converted into one or more cypher queries. In one or more embodiments, the structured search criteria data object is converted into a plurality of query statements.

At operation 1130, the apparatus 200 includes means such as the data intake circuitry 210, the language translation circuitry 212, the data derivation circuitry 214, the communications circuitry 208, the input/output circuitry 206, the processor 202, and or the like, or a combination thereof, that fetches a results data stream from the graph database by causing execution of the at least one query statement. In one or more embodiments, the results data stream is returned in a nested sub-graph format. In one or more embodiments, the results data stream is returned in a flat format comprising at least one node object or relationship. In one or more embodiments, the results data steam is fetched based at least in part on a limit of a number of data objects determined based at least in part on identification of a requesting application corresponding to the request. In one or more embodiments, the results data stream is fetched based at least in part on a limit of a number of data objects indicated by a user. In one or more embodiments, the graph database that is searched comprises a plurality of node objects linked by relationships. In one or more embodiments, the graph database that is searched comprises a Neo4j instance.

FIG. 12 illustrates a flowchart depicting operations of an example process for allowing access to an API endpoint in accordance with at least some example embodiments of the present disclosure. Specifically, FIG. 12 depicts operations of an example process 1200. In some embodiments, the process 1200 is embodied by a computer program code stored on a non-transitory computer-readable storage medium of a computer program product configured for execution to perform the process as depicted and described. Alternatively or additionally, in some embodiments, the process 1200 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, process 1200 is described as performed by and from the perspective of the apparatus 200.

The process 1200 begins at operation 1210. At operation 1210, the apparatus 200 includes means such as the data intake circuitry 210, the language translation circuitry 212, the data derivation circuitry 214, the communications circuitry 208, the input/output circuitry 206, the processor 202, and or the like, or a combination thereof, that authenticates a user. The apparatus may authenticate a user in a number of ways. In one or more embodiments, the user is authenticated with a password. In one or more embodiments, a user is authenticated via single sign on (SSO) technology. In still further embodiments, a user may be authenticated by biometrics.

At operation 1220, the apparatus 200 includes means such as the data intake circuitry 210, the language translation circuitry 212, the data derivation circuitry 214, the communications circuitry 208, the input/output circuitry 206, the processor 202, and or the like, or a combination thereof, that allows access to the API endpoint after the user is authenticated. In one or more embodiments, a user may be granted permanent access to the API endpoint. In one or more embodiments, a user may be granted temporary access to the API endpoint.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid infrastructures.

A computer-program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for searching a graph database configurable via an extensible object model, the apparatus comprising at least one processor and at least one non-transitory memory including computer-coded instructions thereon, the computer-code instructions configured to, with the at least one processor, cause the apparatus to:
receive a request comprising a structured search criteria data object at an application programming interface (API) endpoint, wherein the structured search criteria data object comprises one or more data values to be searched in the graph database,
wherein the one or more data values are not directly consumable to query the graph database, and wherein each of the one or more data values are inter-related;
automatically convert the one or more data values of at least a first sub-object and a second sub-object of the structured search criteria data object into at least one query statement, wherein the one or more data values are converted using data query translation library code, wherein the at least one query statement searches based at least in part on path matching constrained by at least a where clause, length of relationships, and/or direction of relationships, and wherein the first sub-object comprises at least one name of at least one group generated from an executed query statement corresponding to the second sub-object; and
fetch a results data stream from the graph database by causing execution of the at least one query statements, wherein the results data stream is presented in a hierarchical format.

2. The apparatus of claim 1, the apparatus further caused to:
receive the at least one name of the at least one group resulting from the first sub-object of the structured search criteria data object, wherein the at least one name is used in the second sub-object of the structured search criteria data object.

3. The apparatus of claim 1, wherein the structured search criteria data object comprises a sub-object that is converted via the data query translation code to a query statement that searches based at least in part on node matching.

4. The apparatus of claim 1, wherein the results data stream is returned in a nested sub-graph format.

5. The apparatus of claim 1, wherein the results data stream is returned in a flat format comprising at least one node object or relationship.

6. The apparatus of claim 1, wherein the results data stream is updated with new results data over time.

7. The apparatus of claim 1, wherein the structured search criteria data object comprises a JSON data object configured to correspond to the extensible object model.

8. The apparatus of claim 1, the apparatus further caused to:
   authenticate a user; and
   after the user is authenticated, allow access to the API endpoint.

9. The apparatus of claim 1, wherein the results data stream is fetched based at least in part on a limit of a number of data objects indicated by a user.

10. The apparatus of claim 1, wherein the results data stream is fetched based at least in part on a limit of a number of data objects determined based at least in part on identification of a requesting application corresponding to the request.

11. The apparatus of claim 1, wherein the structured search criteria data object is converted into a plurality of query statements.

12. The apparatus of claim 1, wherein the query statement comprises a cypher query statement.

13. The apparatus of claim 1, wherein the graph database comprises a Neo4j instance.

14. The apparatus of claim 1, wherein the graph database comprises a plurality of node objects linked by one or more relationships.

15. A computer-implemented method comprising:
   receiving a request comprising a structured search criteria data object at an application programming interface (API) endpoint, wherein the structured search criteria data object comprises one or more data values to be searched in the graph database,
wherein the one or more data values are not directly consumable to query the graph database and wherein each of the one or more data values are inter-related;
   automatically converting the one or more data values of at least a first sub-object and a second sub-object of the structured search criteria data object into at least one query statement, wherein the one or more data values are converted using data query translation library code, wherein the at least one query statement searches based at least in part on path matching constrained by at least a where clause, length of relationships, and/or direction of relationships, and wherein the first sub-object comprises at least one name of at least one group generated from an executed query statement corresponding to the second sub-object; and
   fetching a results data stream from a graph database by causing execution of the at least one query statement, wherein the results data stream is presented in a hierarchical format.

16. The computer-implemented method of claim 15 further comprising:
   receiving the at least one name of the at least one group resulting from the first sub-object of the structured search criteria data object, wherein the at least one name is used in the second sub-object of the structured search criteria data object.

17. The computer-implemented method of claim 15, wherein the structured search criteria data object comprises a sub-object that is converted via the data query translation code to a query statement that searches based at least in part on node matching.

18. A computer program product comprising at least one non-transitory computer-readable storage medium having computer program code stored thereon that, in execution with at least one processor, is configured for:
   receiving a request comprising a structured search criteria data object at an application programming interface (API) endpoint, wherein the structured search criteria data object comprises one or more data values to be searched in the graph database, wherein the one or more data values are not directly consumable to query the graph database, and wherein each of the one or more data values are inter-related;
   automatically converting the one or more data values of at least a first sub-object and a second sub-object of the structured search criteria data object into at least one query statement,
wherein one or more data values are converted using data query translation library code, wherein the at least one query statement searches based at least in part on path matching constrained by at least a where clause, length of relationships, and/or direction of relationships, and wherein the first sub-object comprises at least one name of at least one group generated from an executed query statement corresponding to the second sub-object; and
   fetching a results data stream from the graph database by causing execution of the at least one query statement, wherein the results data stream is presented in a hierarchical format.

19. The computer program product according to claim 18, the computer program product further configured for:
   receiving the at least one name of the at least one group resulting from the first sub-object of the structured search criteria data object, wherein the at least one name is used in the second sub-object of the structured search criteria data object.

* * * * *